United States Patent [19]
Cobb et al.

[11] Patent Number: 5,830,970
[45] Date of Patent: Nov. 3, 1998

[54] SILICONE POLYETHER SURFACTANTS

[75] Inventors: Vicky Sue Cobb, Elsie, Mich.; Wanda Wells Rauscher, Angleton, Tex.; Michael Allen Stanga, Midland, Mich.; Robert Edward Stevens, Wescosville, Pa.; Robert H. Whitmarsh, Lake Jackson, Tex.; Kevin Dale Wiese, Ballwin, Mo.

[73] Assignee: Dow Corning Corporation, Midland, Mich.

[21] Appl. No.: 762,846

[22] Filed: Dec. 10, 1996

Related U.S. Application Data

[63] Continuation-in-part of Ser. No. 577,588, Dec. 22, 1995, abandoned.

[51] Int. Cl.[6] ................................................. C08G 77/14
[52] U.S. Cl. .......................... 528/25; 521/112; 252/351; 528/29; 528/31; 556/445
[58] Field of Search ............................. 521/112; 252/351; 528/25, 31, 29; 556/445

[56] References Cited

U.S. PATENT DOCUMENTS

| | | | |
|---|---|---|---|
| 3,980,688 | 9/1976 | Litteral et al. | 252/182 |
| 4,147,847 | 4/1979 | Schweiger | 521/112 |
| 4,855,379 | 8/1989 | Budnick et al. | 528/29 |
| 5,145,879 | 9/1992 | Budnik et al. | 521/112 |
| 5,432,206 | 7/1995 | Stanga et al. | 521/110 |
| 5,489,617 | 2/1996 | Miller et al. | 521/112 |

*Primary Examiner*—Rachel Gorr
*Attorney, Agent, or Firm*—Timothy J. Troy

[57] ABSTRACT

The present invention relates to a siloxane-oxyalkylene copolymer surfactant having the formula $MD_xD'_yM$ wherein M represents $(CH_3)_3SiO_{1/2}$, or $R(CH_3)_2SiO_{1/2}$, D represents $(CH_3)_2SiO_{2/2}$, D' represents $(CH_3)RSiO_{2/2}$, and the value of x+y is from 48 and 220, and the ratio x/y is from 5 to 15 inclusive. In the above formulae for M and D', R is a polyether-containing substituent selected from the group consisting of (1) $-C_nH_{2n}O(C_2H_4O)_a(C_3H_6O)_bR'$ moieties having weight average molecular weights in the range 2300–3400 and wherein n is 3–4, the ratio a/b is from 0.5 to 1.3 inclusive, R' represents hydrogen, an alkyl group of 1-4 carbon atoms or $-C(O)CH_3$ and (2) $-C_{n'}H_{2n'}O(C_2H_4O)_{a'}(C_3H_6O)_{b'}R'$ moieties having weight average molecular weights in the range 750–1400 and wherein n' is 3–4, a' is a number such that the ethylene oxide residues constitute 30–100% by weight of the alkylene oxide residues of the polyether, b' is a number such that the propylene oxide residues constitute 0–70% by weight of the alkylene oxide residues of the polyether, R' represents hydrogen, an alkyl group of 1–4 carbon atoms or $-C(O)CH_3$, and the blend average molecular weight of the overall polyether-containing substituents R in the compositions is in the range from 1500 to 2200 and the overall EO/PO molar ratio ranges from 0.65 to 1.2. The siloxane-oxyalkylene copolymer surfactants are useful in producing flexible polyurethane slabstock foams.

12 Claims, No Drawings

SILICONE POLYETHER SURFACTANTS

This is a continuation-in-part of application Ser. No. 08/577,588, filed Dec. 22, 1995, now abandoned.

BACKGROUND OF THE INVENTION

This invention relates to silicone surfactants, and more specifically to silicone polyether surfactants having a siloxane backbone and oxyalkylene pendant groups. The surfactants of the present invention are useful in the manufacture of flexible polyurethane foams.

In polyurethane foam manufacturing, surfactants are required to stabilize the foam until the polymer-forming chemical reactions are sufficiently complete so that the foam is self-supporting and does not suffer objectionable collapse.

Silicone polyether surfactants for polyurethane foam manufacture are typically materials having siloxane backbones and pendant polyether groups. They are of two types, nonhydrolyzable and hydrolyzable. The nonhydrolyzable surfactants, in which the pendant polyether groups are attached to the siloxane backbone via Si—C bonds, are generally believed to provide high efficiencies but poor processing latitudes. Hydrolyzable surfactants, in which the pendant polyether groups are attached to the siloxane backbone via Si—OC bonds, are generally believed to have poor efficiencies but wide processing latitudes.

SUMMARY OF THE INVENTION

The present invention provides nonhydrolyzable silicone surfactants which provide excellent emulsification, efficiency and broad processing latitude in the formation of flexible polyurethane slabstock foams, especially in slabstock foam formulations containing high water levels and low isocyanate indices. Moreover, flexible polyurethane slabstock foams produced with a silicone surfactant of the present invention showed better foam heights, while maintaining finer cell structures, than foams produced with other surfactants.

The surfactants of this invention are compositions of matter having the average formula $MD_xD'_yM$ wherein M represents $(CH_3)_3SiO_{1/2}$ or $R(CH_3)_2SiO_{1/2}$, D represents $(CH_3)_2SiO_{2/2}$, D' represents $(CH_3)RSiO_{2/2}$, the value of x+y is from 48 to 220, and the ratio x/y is from 5 to 15 inclusive. In the above formula for M and D', R is a polyether-containing substituent selected from the group consisting of (1) $-C_nH_{2n}O(C_2H_4O)_a(C_3H_6O)_bR'$ moieties having weight average molecular weights in the range 2300–3400 and wherein n is 3–4, the ratio a/b is from 0.5 to 1.3 inclusive, R' represents hydrogen, an alkyl group of 1–4 carbon atoms or $-C(O)CH_3$ and (2) $-C_{n'}H_{2n'}O(C_2H_4O)_{a'}(C_3H_6O)_{b'}R'$ moieties having weight average molecular weights in the range 750–1400 and wherein n' is 3–4 a' is a number such that the ethylene oxide residues constitute 30–100% by weight of the alkylene oxide residues of the polyether, b' is a number such that the propylene oxide residues constitute 0–70% by weight of the alkylene oxide residues of the polyether, R' represents hydrogen, an alkyl group of 1–4 carbon atoms or $-C(O)CH_3$.

Further the surfactant compositions $MD_xD'_yM$ of the invention contain polyether-containing substituents R having weight average molecular weights in the range 2300–3400 and polyether-containing substituents R having weight average molecular weights in the range 750–1400, and the blend average molecular weight of the overall polyether-containing substituents R in the compositions $MD_xD'_yM$ is in the range 1500–2200, and the overall ratio of ethylene oxide (EO) residues in both polyethers to propylene oxide (PO) residues in both polyethers, i.e., the overall EO/PO molar ratio, is in the range from 0.65–1.2.

DETAILED DESCRIPTION OF THE INVENTION

The surfactants of this invention are compositions of matter having the average formula $MD_xD'_yM$ wherein M represents $(CH_3)_3SiO_{1/2}$ or $R(CH_3)_2SiO_{1/2}$, D represents $(CH_3)_2SiO_{2/2}$, D' represents $(CH_3)RSiO_{2/2}$, and the value of x+y is from 48 to 220, and the ratio x/y is from 5 to 15 inclusive. In the above formulae for M and D', R is a polyether-containing substituent selected from the group consisting of (1) $-C_nH_{2n}O(C_2H_4O)_a(C_3H_6O)_bR'$ moieties having weight average molecular weights in the range 2300–3400 and wherein n is 3–4, the ratio a/b is from 0.5 to 1.3 inclusive, R' represents hydrogen, an alkyl group of 1–4 carbon atoms or $-C(O)CH_3$ and (2) $-C_{n'}H_{2n'}O(C_2H_4O)_{a'}(C_3H_6O)_{b'}R'$ moieties having weight average molecular weights in the range 750–1400 and wherein n' is 3–4, a' is a number such that the ethylene oxide residues constitute 30–100% by weight of the alkylene oxide residues of the polyether, b' is a number such that the propylene oxide residues constitute 0–70% by weight of the alkylene oxide residues of the polyether, and R' represents hydrogen, an alkyl group of 1–4 carbon atoms or $-C(O)CH_3$. Further the surfactant compositions $MD_xD'_yM$ of the invention contain polyether-containing substituents R having weight average molecular weights in the range 2300–3400 and polyether-containing substituents R having weight average molecular weights in the range 750–1400, and the blend average molecular weight of the polyether-containing substituents R in the compositions $MD_xD'_yM$ is in the range 1500–2200, and the overall ratio of ethylene oxide to propylene oxide residues, i.e., the overall EO/PO molar ratio, is in the range from 0.65–1.2.

Within the broad range of compositions of the invention as defined are a number of preferred materials. The preferred material has the general average formula $MD_{44-63}D'_{5.5-12.5}M$. A most preferred material within this class has the general average formula $MD_{60-62}D''_{7-8}M$. The polyether-containing substituents R having weight average molecular weights in the range 2300–3400 are preferably $-C_3H_6O(C_2H_4O)_a(C_3H_6O)_bR'$ moieties with an a/b ratio of 1.0 and having weight average molecular weights of approximately 3100. R' is preferably $-C(O)CH_3$.

The polyether-containing substituents R having weight average molecular weights in the range 750–1400 are preferably $-C_3H_6O(C_2H_4O)_a(C_3H_6O)_bR'$ moieties containing approximately 43% by weight of ethylene oxide residues and having weight average molecular weights of approximately 1250. R' is preferably $-C(O)CH_3$.

The blend weight average molecular weight of the polyether-containing substituents R in the composition $MD_xD'_yM$ is preferably in the range 1650–1900. The overall average EO/PO molar ratio is preferably about 1.0.

Procedures for synthesizing nonhydrolyzable surfactants having polyalkylene oxide pendant groups are well known. Representative disclosures are provided in U.S. Pat. Nos. 4,147,847 and 4,855,379, which are hereby incorporated by reference.

Typically, the surfactants of the invention are prepared by causing a polyhydridosiloxane of generalized average formula $M^*D_xD''_yM^*$ to react with an appropriately chosen blend of allyl oxyalkylene polyethers in the presence of a hydrosilation catalyst such as chloroplatinic acid. In the formula for the polyhydridosiloxane, $M^*$ is $(CH_3)_3SiO_{1/2}$ or (H)(CH$_3$)$_2$SiO$_{1/2}$, D is as defined above, and D" is (CH$_3$)(H)SiO$_{2/2}$. The allyl oxyalkylene polyethers are polyethers having a terminal vinyl group and containing multiple units derived from ethylene oxide, propylene oxide, or both. The reagents are mixed, generally in a solvent such as toluene or isopropanol (2-propanol), heated to about 70°–85° C., then the catalyst is added, a temperature rise of about 10°–15° C. is observed, and the mixture is finally sampled and analyzed for SiH groups by adding alcohol and base and measuring evolved hydrogen. If a volatile solvent is used, it is removed by vacuum.

The polyhydridosiloxanes having the average formula M*D$_x$D"$_y$M* are prepared in the manner known to the art. For the case in which M* is (CH$_3$)$_3$SiO$_{1/2}$, an alkyldisiloxane such as hexamethyldisiloxane, a polyhydridosiloxane polymer, and an alkylcyclosiloxane such as octamethylcyclotetrasiloxane are reacted in the presence of a strong acid such as sulfuric acid. For the case in which M* is (H)(CH$_3$)$_2$SiO$_{1/2}$, a hydridoalkyldisiloxane such as dihydridotetramethyldisiloxane, a polyhydridosiloxane polymer, and an alkylcyclosiloxane such as octamethylcyclotetrasiloxane are reacted in the presence of a strong acid such as sulfuric acid.

The allyl oxyalkylene polyethers, also referred to as polyethers, are likewise prepared in a manner known to the art. An allyl alcohol, optionally bearing a substituent on the 1- or 2-position, is combined with ethylene oxide, propylene oxide, or both, in the presence of a base catalyst, to yield the desired polyether with a terminal hydroxyl group. This is typically capped by further reaction with an alkylating or acylating agent such as a methyl halide or acetic anhydride, respectively, to obtain an alkoxy or acetyl endgroup. Other end caps may of course be employed, including hydrogen, alkoxy groups or alkyl or aryl groups.

The surfactants of the invention are employed in the manufacture of flexible polyurethane foam in the manner known to the art. In producing the polyurethane foams using the surfactants of this invention, one or more polyols, preferably polyalkylene ether polyols, are employed for reaction with a polyisocyanate to provide the urethane linkage. Such polyols have an average of typically 2.1 to 3.5 hydroxyl groups per molecule. Illustrative of suitable polyols as a component of the polyurethane composition are the polyalkylene ether and polyester polyols. The preferred polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as caprolactone with propylene glycol.

In addition to the polyether and polyester polyols, the masterbatches, or premix compositions, frequently contain a polymer polyol. Polymer polyols are used in polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20–80% of the polyol portion of the masterbatch.

The polyurethane products are prepared using any suitable organic polyisocyanates well known in the art including, for example, hexamethylene diisocyanate, phenylene diisocyanate, toluene diisocyanate ("TDI") and 4,4'-diphenylmethane diisocyanate ("MDI"). Especially suitable are the 2,4- and 2,6-TDI's individually or together as their commercially available mixtures. Other suitable isocyanates are mixtures of diisocyanates known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially prereacted mixture of a polyisocyanates and a polyether or polyester polyol.

Suitable urethane catalysts useful in the present invention are all those well known to the worker skilled in the art including tertiary amines such as triethylene diamine, N-methylmorpholine, N-ethylmorpholine, triethylamine, tributylamine, triethanolamine, dimethylethanolamine and bisdimethylaminodiethylether, and organotins such as stannous octoate, stannous acetate, stannous oleate, stannous laurate, dibutyltin dilaurate, and other such tin salts.

Other typical agents which may be found in the flexible polyurethane foam formulations include chain extenders such as ethylene glycol and butanediol; crosslinkers such as diethanolamine, diisopropanolamine, triethanolamine and tripropanolamine; and especially blowing agents such as water, liquid carbon dioxide, acetone, pentane, trichloroethane, methylene chloride, trichlorofluoromethane, and the like.

Other additives may of course be employed to impart specific properties to the foam. Examples are materials such as flame retardants, colorants, fillers and hardness modifiers.

The polyurethane foams of this invention may be formed in accordance with any of the processing techniques known to the art, such as, in particular, the "one shot" technique. In accordance with this method, foamed products are provided by carrying out the reaction of the polyisocyanate and polyol simultaneously with the foaming operation. It is sometimes convenient to add the surfactant to the reaction mixture as a premixture with one or more of the blowing agent, polyol, water, and catalyst components.

It is to be understood that the relative amounts of the various components of the foam formulation are not narrowly critical. The polyol and polyisocyanate are present in the foam-producing formulation in the major amount. The relative amounts of these two components in the mixture are well known to the art. The blowing agent, catalysts, and surfactant are each present in a minor amount sufficient to foam the reaction mixture. The catalysts are present in a catalytic amount, i.e., that amount necessary to catalyze the reactions to produce the urethane and urea at a reasonable rate, and the surfactant is present in the amount sufficient to impart the properties desired and to stabilize the reacting foam, for example, 0.4 to 2 pphpp.

In a typical preparation, the polyol, water, surfactant, amine catalyst, and optional blowing agent are blended together, then the tin catalyst is added with stirring, and finally toluene diisocyanate is mixed in and the composition is allowed to foam and polymerize.

The flexible polyurethane foams produced in accordance with the present invention can be used in the same area as conventional polyurethane foams. For example, the foams of the present invention can be used with advantage in the manufacture of textile interliners, cushions, mattresses, padding, carpet underlay, packaging, gaskets, sealers, thermal insulators and the like.

A general polyurethane flexible slabstock foam formulation containing the silicone surfactants according to the invention would comprise the following components in parts by weight:

| Flexible Slabstock Foam Formulation | |
|---|---|
| Polyol | 100 |
| Silicone Surfactant | 0.4–2 |
| Water | 2–7 |
| Auxiliary Blowing Agent | 0–20 |
| Amine Urethane Catalyst | 0.05–0.3 |
| Tin Urethane Catalyst | 0.1–0.35 |
| Isocyanate Index | 85–120 |
| (preferably TDI) | |

In a preferred flexible slabstock foam formulation the water level is 6–7 pphpp and the isocyanate is TDI at an index in the range of about 80 to less than 100.

In the following examples the foams were made in accordance with the following formulation and procedure:

| Voranol 3137 polyol | 100.00 pphpp |
|---|---|
| Water | 6.50 pphpp |
| DABCO ® CS90 amine | 0.10 pphpp |
| DABCO T-10 tin | 0.32 pphpp |
| Silicone Surfactant | 0.60 pphpp |
| TDI (95 Index) | 67.66 pphpp | pphpp = parts per hundred parts polyol

1) For each foam a corrugated box having dimensions 14×14×14 inches (35.6×35.6×35.6 cm) was prepared. Alternatively, a polyethylene liner was prepared and inserted into a 3.5 gallon (13.3 liter) bucket.

2) A premix was prepared for each series of foams. The premix contained Voranol 3137 polyol (from Dow Chemical Company), water, and DABCO CS90 amine catalyst (from Air Products and Chemicals, Inc.).

3) Premix was weighed into a 48 ounce (1.42 liter) paper cup and silicone surfactant was added.

4) In a separate 250 mL plastic beaker, TDI (toluene diisocyanate) was weighed.

5) DABCO T-10 catalyst (from Air Products and Chemicals, Inc.) was added to the premix cup and mixed for 10 seconds with an electronic mixer at 2000 rpm. DABCO T-10 catalyst is a 50% dilution of stannous octoate.

6) The contents of the TDI beaker were poured into the premix cup and immediately mixed for 7 seconds with an electronic mixer at 2000 rpm.

7) A stopwatch was started when the electronic mixer started to mix the contents of the cup containing premix and TDI.

8) The mixture was poured into the container keeping the lip of the cup as close to the bottom of the container as possible to avoid splashing.

9) The remaining material in the cup was weighed.

10) For each foam the following data was obtained: full rise time, full rise height, and full cure height after 16 hours.

11) The foams were sectioned after 16 hours. Samples of dimensions 2×2×1 inch (5.08×5.08×2.54 cm) were taken from the top and the bottom of the foam for airflow and density determinations. The bottom section was taken 1.5 inches (3.81 cm) from the bottom of the foam. The top section was taken 7.5 inches (19.05 cm) from the bottom of the foam.

EXAMPLE 1

Polyurethane foams were made in accordance with the procedures described above using the following surfactants. These foams were made using the boxes.

Surfactants A and B are proprietary commercial silicone surfactants available from OSi Specialties, Inc. They were used for comparison purposes.

Surfactants C and D are proprietary commercial silicone surfactants available from Th Goldschmidt AG. They were used for comparison purposes.

Surfactant E is a proprietary commercial silicone surfactant available from Air Products and Chemicals, Inc. It was used for comparison purposes.

Surfactant F is a silicone surfactant of the present invention having a siloxane backbone with x+y=68 and a target x/y ratio of 8. Two polyether-containing substituents with —C(O)CH$_3$ endgroups are pendant. The first, present in 35% by weight of the total, has an approximate molecular weight of 3100 and an a/b ratio of 1.0. The second, present in 65% by weight of the total, has an approximate molecular weight of 1250 and an a'/b' ratio of 1.0.

The performance of foams prepared using each of the above surfactants is described in Table 1. In Table 1, the terms have the following meanings:

"Full Rise Height" is the maximum height in millimeters obtained during the rise of the foam.

"Full Cure Height" is the maximum height in millimeters of the foam after curing at room temperature for 16–24 hours.

$$\text{"\% Sighback"} = 100 \times \frac{\text{(Full Rise Height} - \text{Full Cure Height)}}{\text{Full Rise Height}}$$

"Top Airflow"=Airflow at a backpressure of 0.5 inches (12.7 mm) of water in ft$^3$/min through a foam sample having dimensions 2×2×1 inch (5.08×5.08×2.54 cm) taken from the top section of the foam.

"Bottom Airflow"=Airflow at a backpressure of 0.5 inches (12.7 mm) of water in ft$^3$/min through a foam sample having dimensions 2×2×1 inch (5.08×5.08×2.54 cm) taken from the bottom section of the foam.

"Cell Count"=average number of cells per linear inch (2.54 cm) of the foam sample.

TABLE 1

| Sur-factant | Full Rise Height | Full Cure Height | % Signback | Top Airflow | Bottom Airflow | Cell Count |
|---|---|---|---|---|---|---|
| A | 276.7 | 268.2 | 3.07 | 1.6 | 1.6 | 9 |
| B | 271.9 | 264.2 | 2.83 | 8.4 | 4.3 | 25 |
| C | 260.7 | 251.0 | 3.72 | 7.5 | 3.4 | 25 |
| D | 287.9 | 280.2 | 2.67 | 3.6 | 2.1 | 16 |

TABLE 1-continued

| Sur-factant | Full Rise Height | Full Cure Height | % Signback | Top Airflow | Bottom Airflow | Cell Count |
|---|---|---|---|---|---|---|
| E | 271.6 | 262.7 | 3.28 | 2.1 | 2.0 | 6 |
| F | 287.3 | 278.2 | 3.17 | 7.1 | 4.3 | 26 |

Table 1 shows that surfactants A, D, and E give foams with low airflows and large cells. Surfactants B and C provide good airflow and cell structure, but give foams of low height. Only surfactant F of the present invention provides foam with fine cell structure, high airflow, and high heights, all the requisite attributes of a good flexible foam.

EXAMPLE 2

Polyurethane foams were made in accordance with the procedures described above using the surfactants described in Table 2 (these foams were made in the buckets). The surfactants are compounds having the general formula $MD_xD'_yM$ wherein M denotes $(CH_3)_3SiO_{1/2}$, D denotes $(CH_3)_2SiO_{2/2}$, D' denotes $(CH_3)RSiO_{2/2}$, R is a polyether-containing substituent selected from the group consisting of: (1) —$C_3H_6O(C_2H_4O)_a(C_3H_6O)_bC(O)CH_3$ having a weight average molecular weight of about 3100 and (2) —$C_3H_6O(C_2H_4O)_a(C_3H_6O)_bC(O)CH_3$ having a weight average molecular weight of about 1250. The values of x, y, a, b, a', b', the blend average molecular weight of the polyether-containing substituents R in the composition, and the overall EO/PO molar ratio for each of the surfactants is delineated in Table 2 below.

TABLE 2

| Surfactant | x | y | a | b | a' | b' | Average Polyether MW | Overall EO/PO molar ratio |
|---|---|---|---|---|---|---|---|---|
| F | 60.4 | 7.6 | 30 | 30 | 12 | 12 | 1664 | 1 |
| G | 60.4 | 7.6 | 30 | 30 | 12 | 12 | 1500 | 1 |
| H | 60.4 | 7.6 | 30 | 30 | 12 | 12 | 1727 | 1 |
| I | 56.7 | 11.3 | 30 | 30 | 12 | 12 | 1500 | 1 |
| J | 56.7 | 11.3 | 30 | 30 | 12 | 12 | 1727 | 1 |
| K | 42.7 | 5.3 | 30 | 30 | 12 | 12 | 1500 | 1 |
| L | 42.7 | 5.3 | 30 | 30 | 12 | 12 | 1727 | 1 |
| M | 40.0 | 8.0 | 30 | 30 | 12 | 12 | 1500 | 1 |
| N | 40.0 | 8.0 | 30 | 30 | 12 | 12 | 1727 | 1 |
| O | 51.6 | 6.4 | 30 | 30 | 12 | 12 | 1664 | 1 |
| P | 51.6 | 6.4 | 30 | 30 | 12 | 12 | 1795 | 1 |
| Q | 60.4 | 7.6 | 30 | 30 | 12 | 12 | 1795 | 1 |
| R | 56.0 | 7.0 | 30 | 30 | 12 | 12 | 1727 | 1 |
| S | 54.6 | 8.4 | 30 | 30 | 12 | 12 | 1605 | 1 |
| T | 54.0 | 9.0 | 30 | 30 | 12 | 12 | 1605 | 1 |
| U | 54.0 | 9.0 | 25 | 25 | 12 | 12 | 1560 | 1 |
| V | 54.0 | 9.0 | 30 | 30 | 15 | 15 | 1909 | 1 |
| W | 54.0 | 9.0 | 30 | 30 | 18 | 18 | 2193 | 1 |
| X | 169.0 | 23.0 | 18 | 18 | 12 | 0 | 1477 | 1.4 |

The use of Surfactants F–W in the foam formulation resulted in all of these surfactants affording good foams. Surfactant X, which had an overall EO/PO molar ratio of 1.4, afforded a foam having coarse cells and low air flow.

EXAMPLE 3

Polyurethane foams were made in accordance with the procedures described above using the surfactants described in Table 3. The surfactants had the same general formula as those employed in Example 2. The values of x, y, a, b, a', b', the blend average molecular weight of the polyether-containing substituents R in the composition, and the overall EO/PO molar ratio for each of the surfactants is delineated in Table 3 below.

TABLE 3

| Surfactant | x | y | a | b | a' | b' | Average Polyether MW | Overall EO/PO molar ratio |
|---|---|---|---|---|---|---|---|---|
| Y | 60.4 | 7.6 | 30 | 30 | 8 | 15 | 1866 | 0.74 |
| Z | 60.4 | 7.6 | 30 | 30 | 8 | 15 | 1662 | 0.68 |
| A' | 60.4 | 7.6 | 30 | 30 | 8 | 15 | 1498 | 0.61 |
| B' | 60.4 | 7.6 | 30 | 30 | 10 | 4 | 1242 | 1.53 |
| C' | 60.4 | 7.6 | 30 | 30 | 10 | 4 | 910 | 2.03 |
| D' | 60.4 | 7.6 | 30 | 30 | 10 | 4 | 1050 | 1.76 |
| E' | 60.4 | 7.6 | 30 | 30 | 12 | 12 | 1333 | 1.00 |
| F' | 60.4 | 7.6 | 30 | 30 | 12 | 12 | 1434 | 1.00 |
| G' | 60.4 | 7.6 | 30 | 30 | 12 | 12 | 1640 | 1.00 |
| H' | 60.4 | 7.6 | 30 | 30 | 12 | 12 | 1916 | 1.00 |

The foams were then measured for full rise height, full cure height, % Sighback, top airflow, and bottom airflow according to the procedures described hereinabove. The results of the measurements are reported in Table 4 below.

TABLE 4

| Surfactant | Full Rise Height | Full Cure Height | % Signback | Top Airflow | Bottom Airflow |
|---|---|---|---|---|---|
| Y | 351.10 | 324.43 | 7.60 | 7.56 | 6.17 |
| Z | 327.46 | 268.28 | 18.07 | 6.21 | 5.54 |
| A' | FINE CELLED TOTAL COLLAPSE | | | | |
| B' | 336.15 | 282.84 | 15.86 | 2.64 | 3.14 |
| C' | COARSE CELLED TOTAL COLLAPSE | | | | |
| D' | COARSE CELLED TOTAL COLLAPSE | | | | |
| E' | 313.80 | 90.00 | 71.32 | — | — |
| F' | 337.03 | 228.56 | 32.19 | 5.15 | 4.49 |
| G' | 342.68 | 320.28 | 6.54 | 6.63 | 5.40 |
| H' | 346.23 | 322.57 | 6.83 | 7.07 | 6.30 |

The use of the surfactants of this invention in the foam formulation resulted in good foams in contrast to surfactants A'–F' which either collapsed or had poor foam characteristics.

That which is claimed is:

1. A composition of matter having the formula $$MD_xD'_yM$$

wherein M represents $(CH_3)_3SiO_{1/2}$ or $R(CH_3)_2SiO_{1/2}$, D represents $(CH_3)_2SiO_{2/2}$, D' represents $(CH_3)RSiO_{2/2}$, and the value of x+y is from 48 to 220, and the ratio x/y is from 5 to 15 inclusive, wherein in the above formulae for M and D', R is a polyether-containing substituent selected from the group consisting of:

(1) —$C_nH_{2n}O(C_2H_4O)_a(C_3H_6O)_bR'$ moieties having weight average molecular weights in the range 2300–3400 and wherein n is 3–4, the ratio a/b is from 0.5 to 1.3 inclusive, R' represents hydrogen, an alkyl group of 1–4 carbon atoms, or —$C(O)CH_3$ and (2) —$C_{n'}H_{2n'}O(C_2H_4O)_a(C_3H_6O)_bR'$ moieties having weight average molecular weights in the range 750–1400 and wherein n' is 3–4, a' is a number such that the ethylene oxide residues constitute 30–100% by weight of the alkylene oxide residues of the polyether, b' is a number such that the propylene oxide residues constitute 0–70% by weight of the alkylene oxide residues of the polyether, R' represents hydrogen, an alkyl group of 1–4 carbon atoms or —C(O)CH$_3$, and the blend average molecular weight of the polyether-containing substituents R in the composition is in the range from 1500 to 2200 and the overall EO/PO molar ratio ranges from 0.65 to 1.2.

2. A composition of matter according to claim 1, wherein the value of x+y is about 68, the ratio x/y is about 8, and R comprises a first polyether-containing substituent at 35 wt %, about 3100 weight average molecular weight, and an a/b ratio of 1.0, and a second polyether-containing substituent at 65 wt %, about 1250 weight average molecular weight, and an a'/b' ratio of 1.0.

3. A composition of matter according to claim 1, wherein x has a value of 44 to 63 and y has a value of 5.5 to 12.5.

4. A composition of matter according to claim 1, wherein x has a value of 60 to 62 and y has a value of 7 to 8.

5. A composition of matter according to claim 1, wherein R' is —C(O)CH$_3$.

6. A composition of matter according to claim 2, wherein R' is —C(O)CH$_3$.

7. A composition of matter according to claim 3, wherein R' is —C(O)CH$_3$.

8. A composition of matter according to claim 4, wherein R' is —C(O)CH$_3$.

9. A composition of matter according to claim 1, wherein (2) is a —C$_3$H$_6$O(C$_2$H$_4$O)$_a$(C$_3$H$_6$O)$_b$R' moiety containing approximately 43% by weight of ethylene oxide residues and having a weight average molecular weight of approximately 1250.

10. A composition of matter according to claim 9, wherein R' is —C(O)CH$_3$.

11. A composition of matter according to claim 1, wherein the blend weight average molecular weight of the polyether-containing substituents R in the composition is from 1650–1900.

12. A composition of matter according to claim 1, wherein the overall average EO/PO molar ratio is 1.0.

* * * * *